Aug. 22, 1944.  G. SCHNEIDER  2,356,277
TREATMENT OF CELLULOSE ACETATE
Filed Oct. 25, 1940
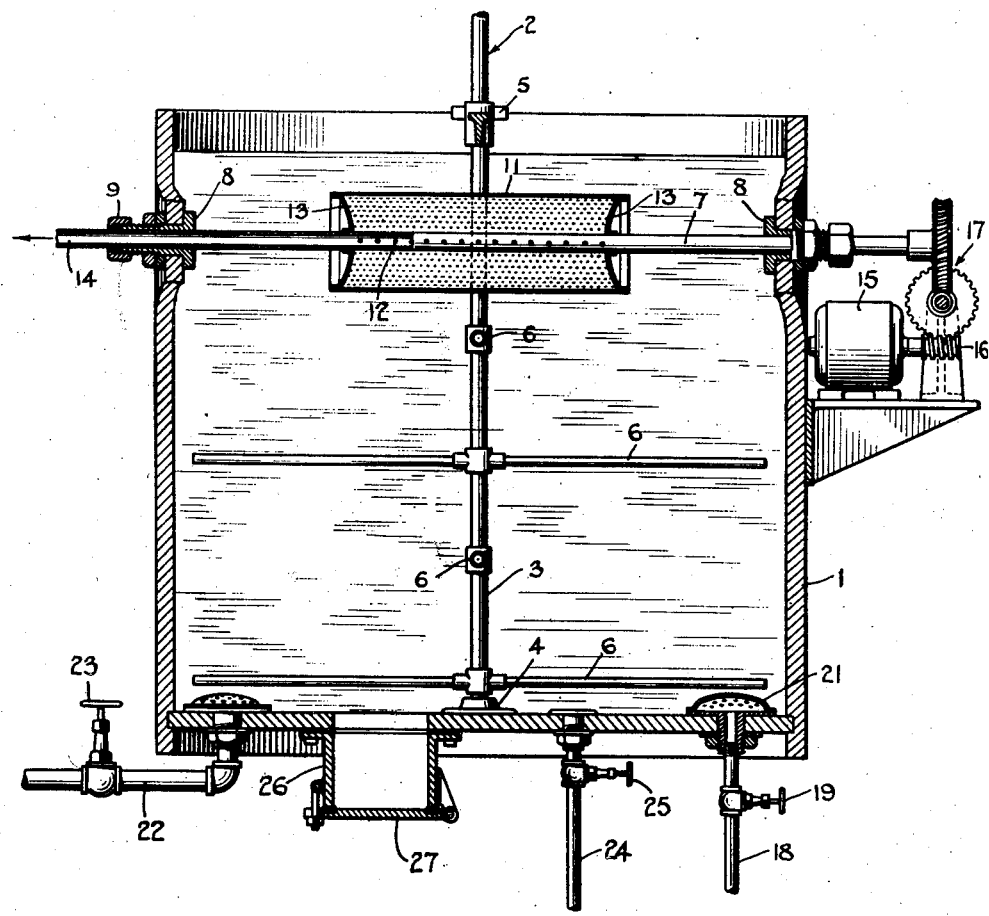
INVENTOR
George Schneider
BY
ATTORNEYS Patented Aug. 22, 1944

2,356,277

UNITED STATES PATENT OFFICE 2,356,277

TREATMENT OF CELLULOSE ACETATE

George Schneider, Montclair, N. J., assignor to Celanese Corporation of America, a corporation of Delaware Application October 25, 1940, Serial No. 362,748

2 Claims. (Cl. 260—230)

This invention relates to the treatment of solid materials with liquids, and relates more particularly to the washing of solid materials in particle form to remove extraneous substances therefrom.

It is an object of this invention to provide a simplified treatment for removing extraneous substances from solid materials in particle form.

Another object of this invention is the provision of improved means for treating cellulose derivatives which have been precipitated from a solution thereof, in order to remove extraneous substances therefrom.

A further object of this invention is to so modify a stabilizing vat as to enable the use of the same as a means for also washing a cellulose derivative in particle form therein.

Other objects of this invention, together with certain details of construction and combinations of parts, will be apparent from the following detailed description.

While this invention is applicable to the treatment of any solid material in particle form, particularly those materials which may be precipitated from solutions thereof, such as inorganic and organic esters of cellulose and cellulose ethers, it is of especial importance in the treatment of cellulose acetate precipitated in the form of particles of varying size and shape from an acetic acid solution thereof, and therefore will be described in connection therewith.

In accordance with my invention, cellulose acetate precipitated in the form of particles of varying size and shape is charged into a stabilizing vat filled with water, which vat has been modified structurally to permit of the washing of the cellulose acetate also. The cellulose acetate is washed by means of a continuous flow of water supplied at the bottom of the stabilizing vat and drained through a rotating screen near the top of the vat and below the surface of the water therein. The vat is supplied with stirrers which turn during the washing of the cellulose acetate. The cellulose acetate is washed until the water tested .09% acidity. The water is then drained down to the boiling level and the charge is brought to a boil and stabilized in the usual manner. As the charge is stabilized, the stabilizing liquor and flood water are drained from the charge. The vat is then filled with cold water, an amount of sodium bicarbonate added in excess of that required to neutralize all of the acid present in the charge and then water is flowed through the vat until the drain water shows a .004% alkalinity in excess of the alkalinity of the water.

This invention will now be described in greater detail with reference to the accompanying drawing wherein one embodiment of my invention is shown.

The figure of the drawing represents a vertical cross-sectional view of the apparatus comprising a stabilizing vat modified in accordance with my invention.

In the drawing there is shown a stabilizing vat 1 of the usual construction provided with an arrangement generally indicated by reference numeral 2 for stirring the contents of said vat. This stirring arrangement comprises a vertical shaft 3 suitably journalled in a bearing 4 at the bottom of the vat and a bearing 5 at the top of the vat, which shaft is adapted to be rotated in any suitable manner (not shown). To the shaft 3 for rotation thereby are attached a series of horizontal stirrer arms 6. Extending horizontally through the vat is a pipe 7 journalled in suitable bearings 8 in the walls of said vat and provided with a gland packing 9 to prevent leakage therefrom. Fixed to said shaft and positioned so that it is below the top of the vat is a cylindrical perforated plate screen 11 of any suitable material but which is preferably made of stainless steel. It is to be understood also that while a cylindrical screen is shown, the screen may be of any other desired configuration such as, for example, screens of square, hexagonal, octagonal, etc. cross-section may be employed. The portion of the pipe 7 within the screen is perforated as shown at 12 for the purpose of withdrawing water from the vat during the washing of the cellulose acetate. This screen 11 has approximately 100 holes per square inch of $\frac{1}{32}$ of an inch in diameter giving a drainage area of approximately 87 square inches of its entire surface. The screen is flanged at either end with solid flanges as shown at 13 and is drained at one end 14 to the outside of the vat. Means are provided for rotating the screen 11, said means comprising a motor 15 rotating a worm 16 which through a gear arrangement generally indicated by reference numeral 17 causes the shaft 7 on which the screen 11 is fixed to rotate. The screen is preferably revolved at about 22 to 25 R. P. M.

Means are provided for admitting water to the bottom of the vat, said means comprising a pipe 18 having a valve 19 therein, the inlet end of the pipe 18 being provided with a screen 21 to prevent any solid matter from entering. The capacity of the pipe 18 must be such as to be considerably in excess of the drainage capacity of pipe 7. However, the valve 19 is opened to a point where the water admitted to maintain a constant level above the screen while the cellulose acetate was being washed. The vat is also provided with a liquid discharge pipe 22 having a valve 23 therein and a steam inlet pipe 24, for heating the mixture of cellulose acetate and water to boiling for stabilizing the cellulose acetate, having a valve 25 therein. In order to discharge the washed solids from the vat a relatively large chute 26 is provided at the bottom of the vat and a drop valve 27 may be placed over the opening of said chute.

It will be seen that by the construction outlined above the vat is used not only for stabilizing the cellulose acetate but also for washing the cellulose acetate thereby effecting a substantial saving in apparatus and in floor space.

It is to be understood that the foregoing detailed description is given merely by way of illustration and that many variations may be made therein without departing from the spirit of my invention.

Having described my invention, what I desire to secure by Letters Patent is:

1. Process for the treatment of cellulose acetate in particle size formed by precipitation from an acetic acid solution thereof, which comprises charging the cellulose acetate particles into a vessel filled with water, continuously passing water through the cellulose acetate particles by admitting the water at the bottom of the vessel and withdrawing the water near the top of the vessel until substantially all of the acid is removed from the cellulose acetate particles, draining some of the water from the vessel, stabilizing the cellulose acetate, again adding water together with a mild alkaline neutralizing agent in an amount greater than .004% in excess of that necessary to neutralize all of the acid present, and then flowing water through the cellulose acetate particles until the drained water shows an alkalinity of .004% in excess of the alkalinity of the added water.

2. Process for the treatment of cellulose acetate in particle size formed by precipitation from an acetic acid solution thereof, which comprises charging the cellulose acetate particles into a vessel filled with water, continuously passing water through the cellulose acetate particles by admitting the water at the bottom of the vessel and withdrawing the water near the top of the vessel until substantially all of the acid is removed from the cellulose acetate particles, draining some of the water from the vessel, stabilizing the cellulose acetate, again adding water together with sodium bicarbonate in an amount greater than .004% in excess of that necessary to neutralize all of the acid present, and then flowing water through the cellulose acetate particles until the drained water shows an alkalinity of .004% in excess of the alkalinity of the added water.

GEORGE SCHNEIDER.